(12) United States Patent
Videtich

(10) Patent No.: US 8,713,140 B2
(45) Date of Patent: Apr. 29, 2014

(54) METHOD AND SYSTEM FOR MODIFYING SATELLITE RADIO PROGRAM SUBSCRIPTIONS IN A MOBILE VEHICLE

(75) Inventor: Matt C. Videtich, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 1386 days.

(21) Appl. No.: 10/135,300

(22) Filed: Apr. 30, 2002

(65) Prior Publication Data

US 2003/0204577 A1 Oct. 30, 2003

(51) Int. Cl.
*G06F 15/173* (2006.01)

(52) U.S. Cl.
USPC ........... 709/223; 709/201; 709/230; 709/217; 455/430; 455/3.04; 455/575.9; 701/1; 707/1

(58) Field of Classification Search
USPC ......... 709/202, 211, 213, 217, 226, 223, 230; 455/430, 3.04, 575.9; 701/1; 707/1
See application file for complete search history.

(56) References Cited

U.S. PATENT DOCUMENTS

| | | | |
|---|---|---|---|
| 6,151,497 A * | 11/2000 | Yee et al. ....................... | 455/430 |
| 6,195,559 B1 * | 2/2001 | Rapeli et al. .................. | 455/550 |
| 6,498,955 B1 * | 12/2002 | McCarthy et al. ............... | 700/1 |
| 6,526,335 B1 * | 2/2003 | Treyz et al. ....................... | 701/1 |
| 6,615,186 B1 * | 9/2003 | Kolls ............................... | 705/26 |
| 6,693,517 B2 * | 2/2004 | McCarthy et al. ......... | 340/425.5 |
| 6,725,303 B1 * | 4/2004 | Hoguta et al. ................. | 710/106 |
| 6,799,201 B1 * | 9/2004 | Lee et al. ....................... | 709/217 |
| 6,856,820 B1 * | 2/2005 | Kolls ......................... | 455/575.9 |
| 6,904,264 B1 * | 6/2005 | Frantz ........................... | 455/3.04 |
| 6,909,361 B2 * | 6/2005 | McCarthy et al. ......... | 340/425.5 |
| 7,003,289 B1 * | 2/2006 | Kolls ........................... | 455/422.1 |
| 7,206,853 B2 * | 4/2007 | Eytchison et al. ............. | 709/230 |
| 2001/0054059 A1 * | 12/2001 | Marks et al. ................... | 709/201 |
| 2002/0049717 A1 * | 4/2002 | Routtenberg et al. ............. | 707/1 |
| 2002/0065037 A1 * | 5/2002 | Messina et al. ............... | 455/12.1 |
| 2002/0118138 A1 * | 8/2002 | Lindenmeier et al. ........ | 343/742 |
| 2003/0040272 A1 * | 2/2003 | Lelievre et al. ............... | 455/3.06 |
| 2003/0043769 A1 * | 3/2003 | Dolman et al. ................ | 370/337 |
| 2003/0046437 A1 * | 3/2003 | Eytchison et al. ............. | 709/250 |
| 2003/0055557 A1 * | 3/2003 | Dutta et al. .................... | 701/208 |
| 2003/0079222 A1 * | 4/2003 | Boykin et al. ................... | 725/31 |
| 2003/0194977 A1 | 10/2003 | Videtich et al. | |
| 2003/0207682 A1 | 11/2003 | Videtich | |
| 2004/0121748 A1 | 6/2004 | Glaza | |
| 2004/0142659 A1 * | 7/2004 | Oesterling .................... | 455/11.1 |
| 2004/0203340 A1 * | 10/2004 | Oesterling ......................... | 455/9 |
| 2004/0250273 A1 * | 12/2004 | Swix et al. ....................... | 725/25 |

(Continued)

OTHER PUBLICATIONS

U.S. Appl. No. 10/136,100, filed May 1, 2002, Matt C. Videtich.

*Primary Examiner* — Thuong Nguyen

(57) ABSTRACT

A system and method is directed to modifying a satellite radio subscription in a mobile vehicle. The method provides for receiving at least one satellite radio subscription modification request from the vehicle at a service provider, retrieving current satellite radio program subscription status at the service provider, determining at least one adjustment required to implement the at least one modification, and sending the determined adjustments required to implement the at least one modification. The system further provides means for receiving at least one satellite radio subscription modification request from the vehicle at a service provider, means for retrieving current satellite radio program subscription status at the service provider, means for determining at least one adjustment required to implement the at least one modification, and means for sending the determined adjustments required to implement the at least one modification.

12 Claims, 4 Drawing Sheets

(56) References Cited

U.S. PATENT DOCUMENTS

| | | |
|---|---|---|
| 2005/0136902 A1 | 6/2005 | Mazzara |
| 2005/0138069 A1 | 6/2005 | Habermas |
| 2005/0156714 A1* | 7/2005 | McCarthy et al. .......... 340/425.5 |
| 2005/0283797 A1* | 12/2005 | Eldering et al. ................ 725/35 |
| 2006/0003762 A1 | 1/2006 | Sumcad et al. |
| 2006/0040609 A1 | 2/2006 | Petschke et al. |
| 2006/0046649 A1 | 3/2006 | Videtich et al. |
| 2006/0057956 A1 | 3/2006 | Grau et al. |
| 2006/0089097 A1 | 4/2006 | Wang |
| 2006/0107060 A1* | 5/2006 | Lewis et al. ................ 713/176 |
| 2006/0128301 A1 | 6/2006 | Dorfstatter et al. |
| 2006/0136106 A1 | 6/2006 | Patenaude et al. |

* cited by examiner

METHOD AND SYSTEM FOR MODIFYING SATELLITE RADIO PROGRAM SUBSCRIPTIONS IN A MOBILE VEHICLE

FIELD OF THE INVENTION

In general, the invention relates to data transmission over a wireless communication system. More specifically, the invention relates to a method and system for modifying satellite radio program subscriptions in a mobile vehicle.

BACKGROUND OF THE INVENTION

Mobile communication units (MCU's), such as cellular phones, personal data assistants (PDA's), Global Positioning System (GPS) devices, and on-board Vehicle Communication Units (VCU's), used in conjunction with a Wide Area Network (WAN), such as a cellular telephone network or a satellite communication system, have made it possible for a person to send and receive voice communications, data transmissions, and FAX messages from virtually anywhere on earth. Such communication is initiated at the MCU when it is turned on, or by entering a phone number to be called, or in many cases, by pressing a preprogrammed button on the MCU or speaking a voice command causing the MCU to automatically complete the process of dialing the number to be called. A radio communication link is established between the MCU and a Wide Area Network (WAN), using a node of the WAN in the vicinity of the MCU.

In cellular telephone systems, a node is commonly referred to as a "cellular base station." Once the radio communication link between the MCU and the cellular base station has been established, the base station then utilizes a combination of additional cellular stations, conventional telephone wire line networks, and possibly even satellite systems to connect the MCU to the number to be called.

Wireless communication services for MCU users, such as navigation and roadside assistance, have increased rapidly in recent years. Most of the services that have been offered are for a motor vehicle in operation, and include services that may require location and destination information. Such services are provided at a cost to the MCU users, and also at a cost to the MCU service provider. MCU service providers must make available a wireless communication service customer assistance center (or other such manually staffed service center) in order that an operator or customer assistant may complete the MCU requests. It would be beneficial to the MCU user and service provider to offer information and services advantageous to the MCU user, yet profitable to the MCU provider without MCU user subsidies. In addition, limited MCU equipped vehicle information is currently requested or used for the immediate advantage of the MCU user.

Recently, additional services have been offered for entertainment purposes, such as satellite radio, terrestrial digital radio, and other wireless communication systems to motor vehicles. Many of these broadcasts may be delivered with additional data such as station identification, song titles, and program schedules. Such services are also provided at a cost to the user and will provide an additional revenue stream if enhancements can be linked to an MCU system. Unfortunately, modifications to the user purchased services tend to be costly due to present requirements that compel the modifications be included in the broadcast stream, and the limited bandwidth available in the stream.

SUMMARY OF THE INVENTION

The present invention is directed to a system and method for modifying satellite radio program subscriptions in a mobile vehicle. The invention allows a service provider to receive a satellite radio subscription modification request from a user, determine adjustments required to implement the modification, and update the satellite radio program subscriptions.

One aspect of the invention provides a method for modifying a satellite radio subscription in a mobile vehicle by receiving at least one satellite radio subscription modification request from the vehicle at a service provider, retrieving current satellite radio program subscription status at the service provider, determining at least one adjustment required to implement the at least one modification, and sending the determined adjustments required to implement the at least one modification.

In accordance with another aspect of the invention, a system for vehicle satellite radio program subscription modification is provided. The system includes means for receiving at least one satellite radio subscription modification request from the vehicle at a service provider. The system further includes means for retrieving current satellite radio program subscription status at the service provider. Means for determining at least one adjustment required to implement the at least one modification is provided. Means for sending the determined adjustments required to implement the at least one modification is also provided.

In accordance with yet another aspect of the invention, a computer readable medium storing a computer program includes: computer readable code for receiving at least one satellite radio subscription modification request from the vehicle at a service provider, computer readable code for retrieving current satellite radio program subscription status at the service provider, computer readable code for determining at least one adjustment required to implement the at least one modification, and computer readable code for sending the determined adjustments required to implement the at least one modification.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Throughout the specification, and in the claims, the term "connected" means a direct electrical connection between the things that are connected, without any intermediate devices. The term "coupled" means either a direct electrical connection between the things that are connected, or an indirect connection through one or more passive or active intermediary devices.

The present invention relates to data transmission over a wireless communication system and more particularly to modifying satellite radio program subscriptions in a mobile vehicle. The present invention allows a service provider to receive a satellite radio subscription modification request from a user, determine adjustments required to implement the modification, and update the satellite radio program subscriptions.

Illustrative Operating Environment

Figure 1:
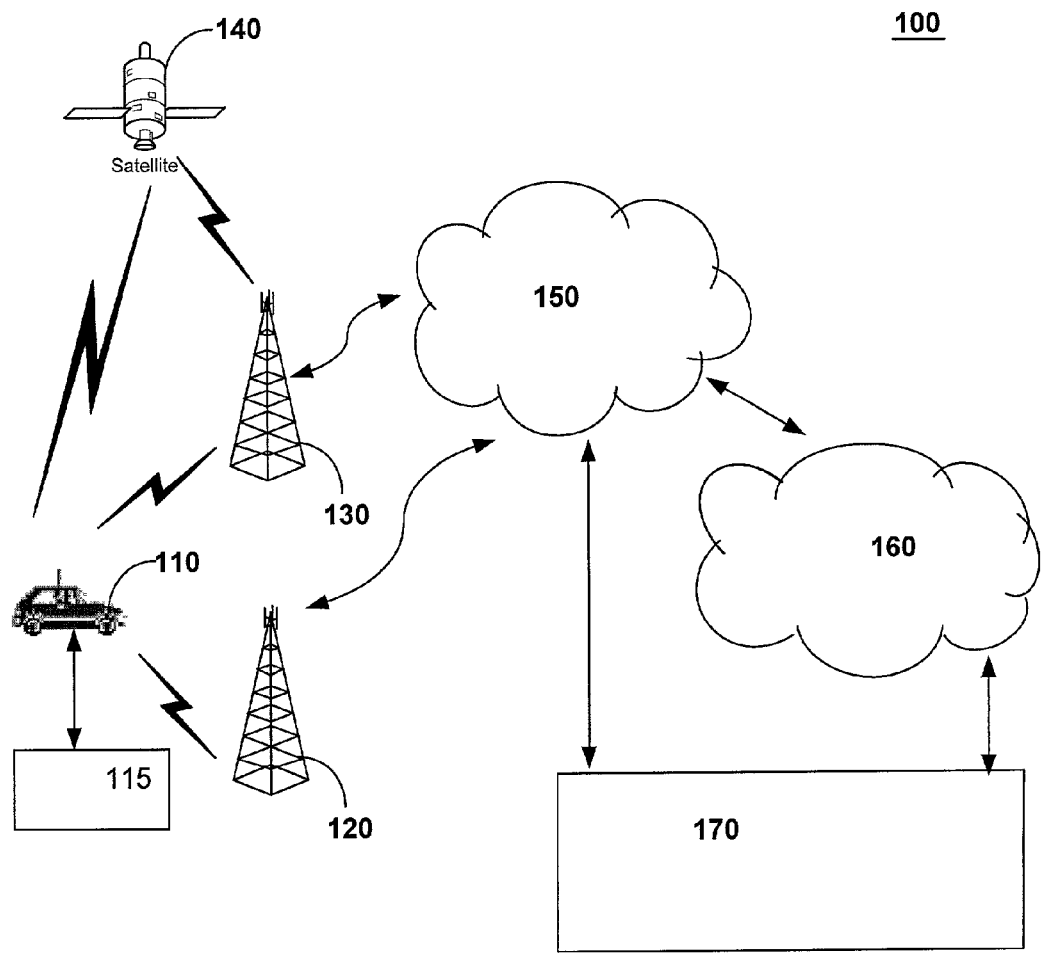
FIG. 1 is a block diagram illustrating an operating environment according to an embodiment of the present invention.

FIG. 1 is a block diagram illustrating an example of an operating environment that is in accordance with the present invention. FIG. 1 details an embodiment of a system for operating a satellite radio subscription service in a mobile vehicle, in accordance with the present invention, and may be referred to as a mobile vehicle communication system (MVCS) 100. The mobile vehicle communication system (MVCS) 100 may include one or more mobile vehicle communication units (MVCU) 110, one or more audio devices 115, one or more wireless communication systems 120, one or more radio carrier systems 130, one or more satellite broadcast systems 140, one or more communication networks 150, one or more land networks 160, and one or more service providers 170.

In one example, MVCS 100 may be implemented as an OnStar system, as is known in the art, with regards to wireless communications, and as an XM Satellite Radio system, as is known in the art, with regards to satellite radio and terrestrial digital radio communications.

MCVU 110 may contain a wireless vehicle communication device (module, MVCS module) such as an analog or digital phone with suitable hardware and software for transmitting and receiving data communications. MCVU 110 may contain a wireless modem for transmitting and receiving data. MCVU 110 may contain a digital signal processor with software and additional hardware to enable communications with the mobile vehicle and to perform other routines and requested services. MCVU 110 may contain a global positioning system (GPS) unit capable of determining synchronized time and a geophysical location of the mobile vehicle. MCVU 110 may send to and receive radio transmissions from wireless communication system 120.

Audio device 115 may include any suitable hardware for receiving broadcast signals in MCVU 110. Audio device 115 includes a receiver and may receive broadcasts from wireless communication system 120, radio broadcast system 130, and satellite broadcast system 140.

Audio device 115 may further include a medium for storing programming information. The programming information may include user requested programs supplied by one or more providers including various formats. Formatted programs may include such formats as "Talk," various music genres, targeted regional information, and the like. In one embodiment, the user requested programs may be provided in the form of packages and referred to as a satellite radio program subscription (SRPS).

Audio device 115 may further include an audio speaker, a synthesized voice output, an audio channel, or the like. Audio device 115 may be implemented, in addition to the receiver, as a set of headphones, the audio portion of a television, a display device, or the like.

MCVU 110 may also contain a speech recognition system (ASR) module capable of communicating with audio device 115. The module may additionally be capable of functioning as any part or all of the above communication devices and, for one embodiment of the invention, may be capable of data storage, and/or data retrieval, and/or receiving, processing, and transmitting data queries. In one example, audio device 115 includes a speech recognition system (ASR) module.

Wireless communications system 120 may be a wireless communications carrier or a mobile telephone system and may transmit to and receive signals from one or more MCVU 110. Wireless communication system 120 may incorporate any type of telecommunications in which electromagnetic waves carry signal over part or the entire communication path. More specific to the present invention, wireless communication system 120 may be any type of broadcast communication in addition to those of radio broadcast system 130 and satellite broadcast system 140. Wireless communications system 120 may be implemented as a single unit in conjunction with radio broadcast system 130, it may be implemented as coupled with radio broadcast system 130, or in some such other configuration as would allow the systems to function as described.

In one example, such wireless communication carrier is a short message service, modeled after established protocols such as IS-637 SMS standards, IS-136 air interface standards for SMS, and GSM 03.40 and 09.02 standards. Similar to paging, an SMS communication could be broadcast to a number of regional recipients.

In another example, the mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications.

Radio broadcast system 130 may transmit radio signals with data to audio device 115 in MCVU 110. Radio broadcast system 130 may transmit analog audio and/or video signals, such as those sent from AM and FM radio stations and transmitters, or digital audio signals in the S band (approved for use in the U.S.) and L band (used in Europe and Canada). Audio device 115 may store or retrieve data and information from the audio and/or video signals of radio broadcast system 130. In one example, audio device 115 retrieves terrestrial digital radio signals from a signal received from radio broadcast system 130.

Satellite broadcast system 140 may transmit radio signals to audio device 115 in MCVU 110. In an embodiment, satellite broadcast system 140 may broadcast over a spectrum in the "S" band (2.3 GHz) that has been allocated by the U.S. Federal Communications Commission (FCC) for nationwide broadcasting of satellite-based Digital Audio Radio Service (DARS). In one example, satellite broadcast system 140 may be implemented as XM Satellite Radio.

Broadcast services provided by radio broadcast system 130 and satellite broadcast system 140 may be received by audio device 115 located within MCVU 110. Broadcast services may include various formatted programs based on a package subscription obtained by the user and managed by the audio device 115 and referred to above.

Communications network 150 may be implemented as any suitable system or collection of systems for connecting wireless communications system 120 to at least one MCVU 110 or to a service provider 170. Communications network 150 may include a mobile switching center and may provide services from one or more wireless communications companies.

Land network 160 may connect communications network 150 to service provider 170. Land network 160 may be implemented as a public-switched telephone network, a wired network, an optical network, a fiber network, another wireless network, or any combination thereof. Land network 160 may comprise an Internet protocol (IP) network. In an embodiment, an MCVU 160 may utilize all or part of the wireless communications system 120, communications network 150, and land network 160.

Land network 160 may connect one or more communications systems 120 to one another. Communication network 150 and land network 160 may connect wireless communications system 120 to a communication node or service provider 170.

Service provider 170 may be implemented as one or more locations where communications may be received or originate to facilitate functioning of the mobile vehicle communication system (MCVS) 100. Service provider 170 may contain any of the previously described functions.

In one embodiment, service provider 170 may be implemented as a call center, as known in the art. In one example, the call center may be implemented as a voice call center, providing verbal communications between an advisor in the call center and a subscriber in a mobile vehicle. In another example, the call center may be implemented as a voice activated call center, providing verbal communications between an ASR unit and a subscriber in a mobile vehicle. In yet another example, the call center may be implemented as a virtual call center, providing virtual communications between a virtual advisor and a user interface. The call center may contain any of the previously described functions.

In a further example, the call center may be implemented to service an OnStar system. In another example, the call center may be implemented to service an XM Satellite Radio system. In yet another example, the call center may be implemented to service one or more of the above examples, or other services.

In operation, a service provider 170 may utilize one or more portions of the aforementioned communications network to communicate subscriber requested programming to audio device 115. The subscriber requested programming may then be accessed to by audio device 115 utilizing one or more radio broadcast system 130 and satellite broadcast system 140 segments.

Figure 2:
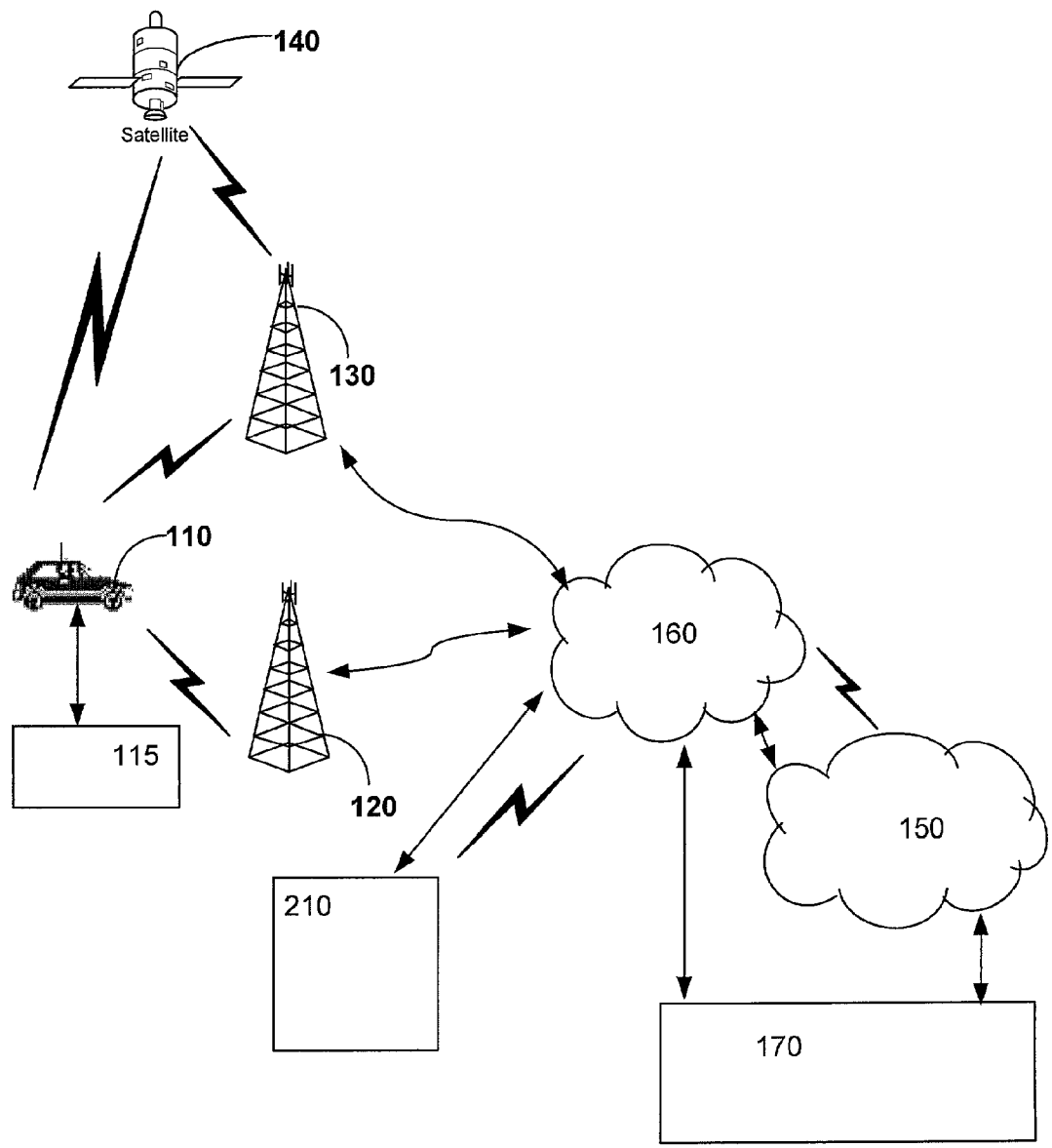
FIG. 2 is a block diagram illustrating an embodiment of the present invention.

FIG. 2 is a block diagram illustrating an embodiment of the present invention. FIG. 2 details an embodiment of a system for modifying satellite radio program subscriptions in a mobile vehicle, in accordance with the present invention, and may be referred to as a user preference satellite reception system (UPSRS). Like components from FIG. 1 and FIG. 2 are labeled identically.

In one example, UPSRS may be implemented as part of an OnStar system, as is known in the art, with regards to wireless communications, and as part of an XM Satellite Radio system, as is known in the art, with regards to satellite radio and terrestrial digital radio communications.

The user preference satellite reception system (UPSRS) may further include one or more user interfaces 210. User interfaces 210 may be implemented to allow a user to communicate with service provider 170 via one or more communication networks 150 and/or land networks 160. In one embodiment, user interfaces 210 may include an ability to send as well as receive and store information. In an example, user interfaces 210 may be implemented as a personal computer or other device allowing communication with service provider 170.

In another embodiment, user interface 210 provides the user access to the service provider 170 where, among other options, the user may request modifications to a satellite radio program subscription (SRPS) from a subscription service. In an example, the subscription service may be implemented as an XM Satellite Radio subscription service.

In yet another embodiment, mobile vehicle communication system (MVCS) 100 provides the user access to the service provider 170 where, among other options, the user may request modifications to the satellite radio program subscription (SRPS) from the subscription service as well.

Exemplary Modification

Figure 3:
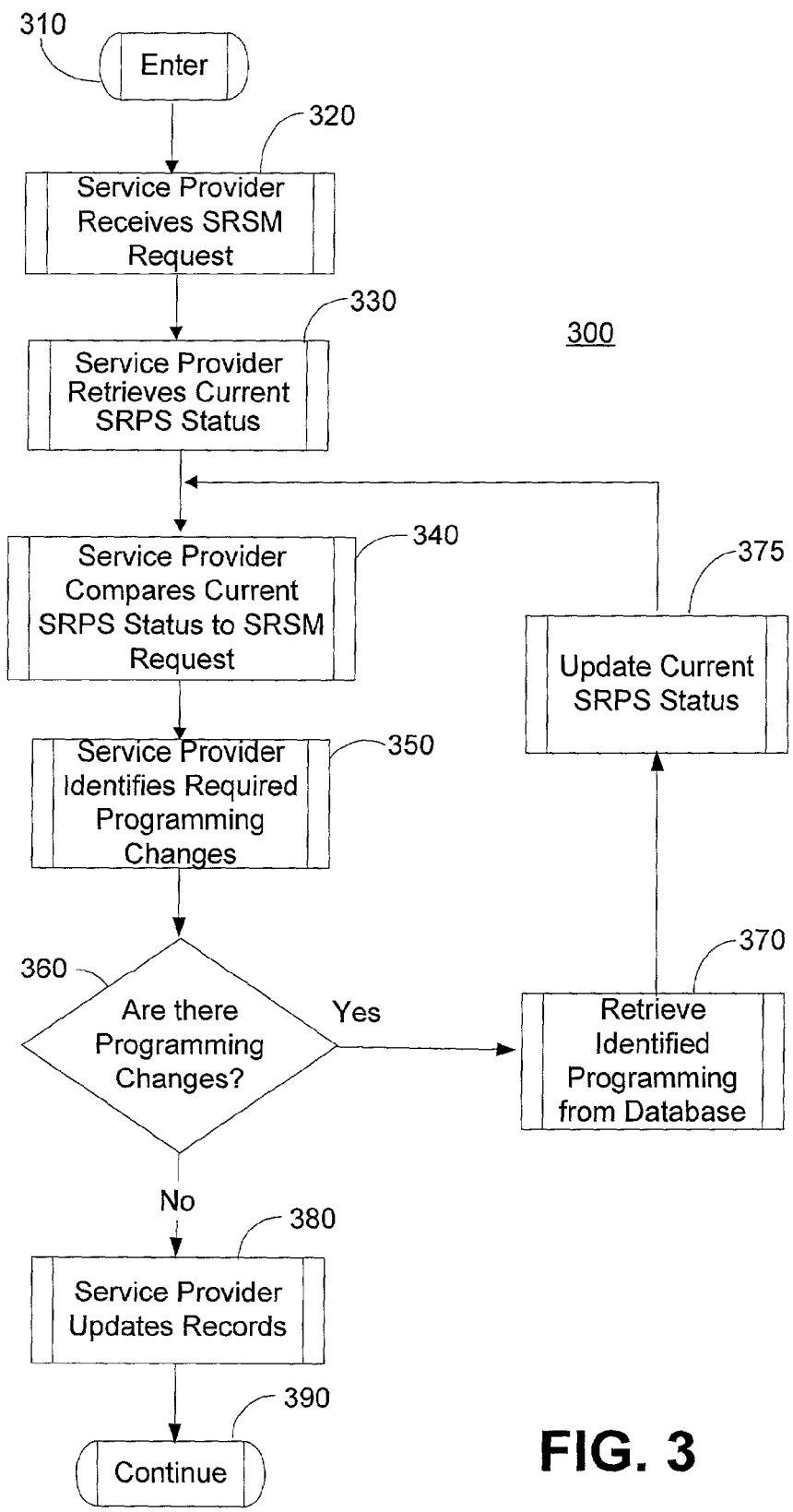
FIG. 3 is a flow diagram depicting an exemplary embodiment of code on a computer readable medium in accordance with the present invention.

FIG. 3 is a flow diagram depicting an exemplary embodiment of code on a computer readable medium in accordance with the present invention. FIG. 3 details an embodiment of a method 300 for modifying satellite radio program subscriptions in a mobile vehicle, in accordance with the present invention. Method 300 may utilize one or more systems detailed in FIGS. 1 and 2 above.

Method 300 begins at block 310 where a user may determine a need to modify a satellite radio subscription. In one embodiment, the satellite radio subscription may be implemented in a user preference satellite reception system (UPSRS) and referred to as a satellite radio program subscription (SRPS). Method 300 then advances to block 320.

At block 320, the user requests a modification to the SRPS. In one embodiment, the requested modification is made to a service provider 170 and referred to as a satellite radio subscription modification (SRSM). In an example, the service provider 170 may be implemented as a call center. In another embodiment, the SRSM request may be made to a satellite radio program provider.

The SRSM may include one or more program modification requests. In one example, a user may request a SRSM to add or remove programming individually or as part of a package. In another example, a user may request a SRSM to remove a specific program from a package due to objectionable content, such as, a mature rating.

In another embodiment, the user accesses service provider 170 via a mobile vehicle communication system (MVCS) 100 as part of the user preference satellite reception system (UPSRS). In one example, UPSRS may be implemented as part of an OnStar system, as is known in the art, with regard to wireless communications, and as part of an XM Satellite Radio system, as is known in the art, with regard to satellite radio and terrestrial digital radio communications.

In yet another embodiment, the user accesses service provider 170 utilizing a user interface 210, via a combination of one or more communication networks 150 and/or land networks 160, to modify the SRPS. In an example, the user may access the service provider 170 utilizing a personal computer via the Internet. The user may then request the satellite radio subscription modification (SRSM). The method then advances to block 330.

At block 330, service provider 170 retrieves current SRPS status. Current SRPS status may include information relating to program subscriptions prior to the requested modification. In one embodiment, service provider 170 retrieves the current SRPS status from a local storage medium. In another embodiment, service provider 170 retrieves the current SRPS status from the mobile vehicle communication system (MVCS) 100. In an example, the current SRPS status may be located within audio device 115. In yet another embodiment, service provider 170 retrieves the current SRPS status from a program provider. The method then advances to block 340.

At block 340, the service provider 170 compares the current SRPS status to the SRSM request. In one embodiment, service provider 170 compares each individual request to the current SRPS status sequentially. In another embodiment, service provider 170 compares multiple requests to the current SRPS status simultaneously. The method then advances to block 350.

At block 350, service provider 170 identifies one or more required programming changes to implement the user requested modifications. In one embodiment, identified programming changes may be arranged to allow sequential replacement. In an example, the user may request a modification including the addition of a programming package with an additional request of removing a specific element of the package due to objectionable content. In another embodiment, identified programming changes may be arranged to allow concurrent replacement. The method then advances to decision block 360.

At decision block 360, service provider 170 determines if there are uncompleted programming changes. If there are uncompleted programming changes, the method advances to block 370. If all programming changes have been completed, the method advances to block 380.

At block 370, service provider 170 retrieves the identified programming from a database. In one embodiment, service provider 170 retrieves one or more programs to be added to the current SRPS status. In another embodiment, service provider 170 retrieves one or more programs to be removed from the current SRPS status. The method then advances to block 375.

At block 375, service provider 170 updates the current SRPS status to reflect retrieved programming changes. In one embodiment, service provider 170 adds the retrieved programming to the current SRPS status creating a newly defined current SRPS status. In another embodiment, service provider 170 removes the retrieved programming from the current SRPS status creating a newly defined current SRPS status. The method then returns to block 340.

In one embodiment, the method will remain in a loop defined as blocks 370-375, decision block 360, and blocks 340-350 until all identified programming changes are implemented.

At block 380, service provider 170 updates records to reflect the implemented changes resulting from the user requested satellite radio subscription modification (SRSM). In one embodiment, service provider 170 sends the newly updated current SRPS to audio device 115 via MCVU 110. In another embodiment, service provider 170 updates call center records located on a local storage medium. In yet another embodiment, service provider 170 updates provider records. The method then advances to block 390 where it returns to standard programming.

Figure 4:
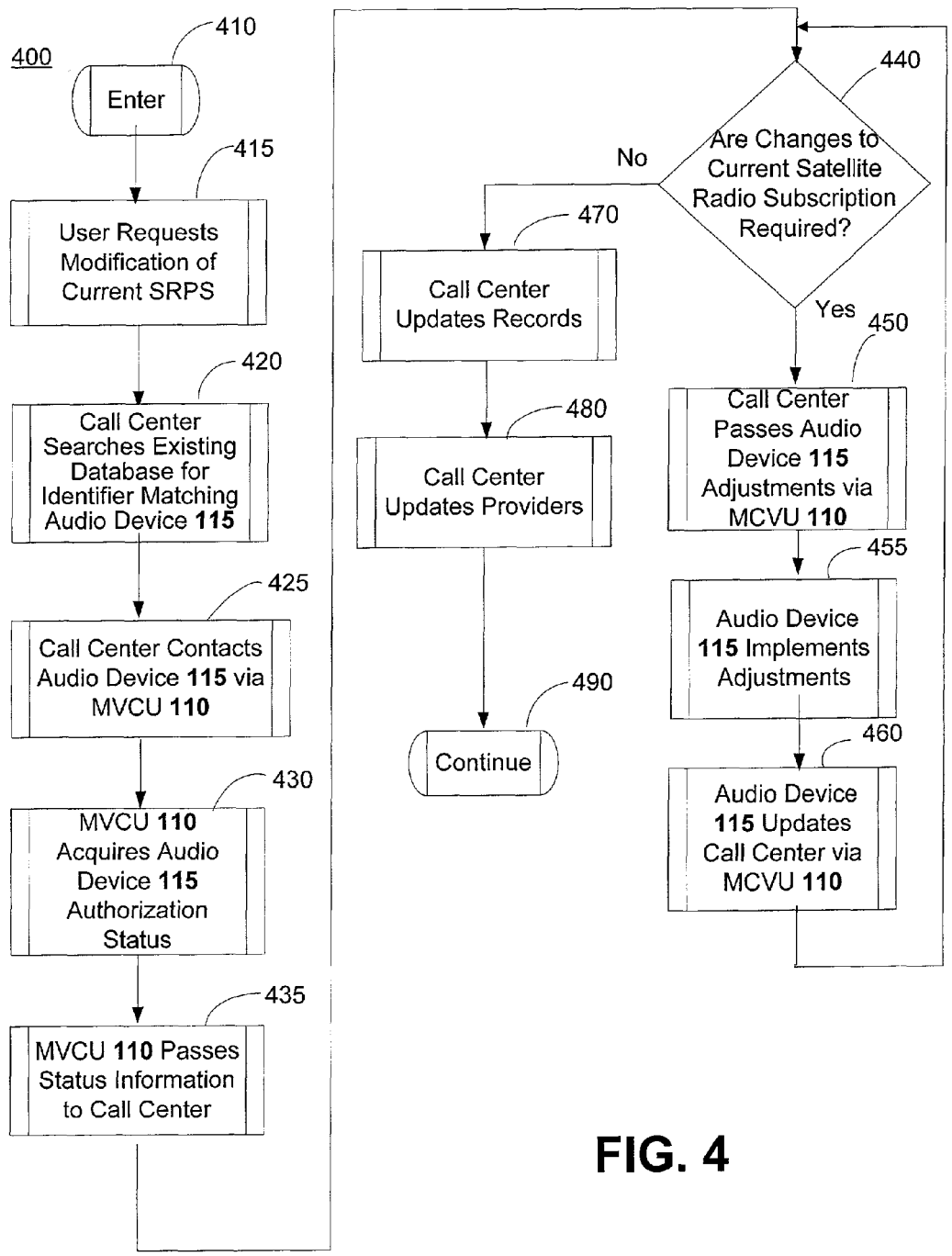
FIG. 4 is a flow diagram depicting another exemplary embodiment of code on a computer readable medium in accordance with the present invention.

FIG. 4 is a flow diagram depicting another exemplary embodiment of code, referred to as a program, on a computer readable medium in accordance with the present invention. FIG. 4 blocks function like similarly described FIG. 3 blocks. FIG. 4 details an embodiment of a method 400 for modifying satellite radio program subscriptions in a mobile vehicle, in accordance with the present invention. Method 400 may utilize one or more systems detailed in FIGS. 1 and 2 above.

Method 400 begins at block 410 where a user may determine a need to modify a satellite radio subscription. In one embodiment, the satellite radio subscription may be implemented in a user preference satellite reception system (UPSRS) and referred to as a satellite radio program subscription (SRPS). Method 400 then advances to block 415.

At block 415, a user requests a modification of a current SRPS implemented within audio device 115 utilizing a service provider 170. In an example, the service provider may be implemented as a call center. In one embodiment, this may be accomplished as in block 320 of FIG. 3. The method then advances to block 420.

At block 420, the call center searches existing databases for an identifier matching the audio device 115. The identifier may be used to insure modifications made to an existing satellite radio program subscription are properly authorized. The method then advances to block 425.

At block 425, the call center contacts audio device 115 included as part of a mobile vehicle communication unit (MCVU) 110. The method then advances to block 430.

At block 430, the mobile vehicle communication unit (MCVU) 110 acquires an authorization status from audio device 115. In one embodiment, the call center receives the identifier directly from audio device 115. In another embodiment, the call center receives the identifier from the user. The method then advances to block 435.

At block 435, the MCVU 110 passes the status information to the call center. The method then advances to decision block 440.

At decision block 435, the call center determines if changes to the current satellite radio subscription are required as a result of the user requested modification. In one embodiment, this may be accomplished as in blocks 340-360 of FIG. 3. If changes are required, the method advances to block 450. If changes are not required, the method advances to block 480.

At block 450, the call center passes audio device 115 adjustments via MCVU 110. In one embodiment, this may be accomplished as in block 380 of FIG. 3. The method then advances to block 455. At block 455, audio device 115 implements the adjustments. In one embodiment, audio device 115 replaces the current SRPS located within a local storage medium with the newly updated current SRPS. The method then returns to decision block 440.

At block 470, the call center updates call center records to reflect the implemented adjustments resulting from the user requested satellite radio subscription modification (SRSM). In one embodiment, this may be accomplished as in block 380 of FIG. 3. The method then advances to block 480.

At block 480, the call center updates provider records to reflect the implemented adjustments resulting from the user requested satellite radio subscription modification (SRSM). In one embodiment, this may be accomplished as in block 380 of FIG. 3. The method then advances to block 490 where it returns to standard programming.

The above-described methods and implementation for modifying satellite radio program subscriptions in a mobile vehicle are example methods and implementations. These methods and implementations illustrate one possible approach for modifying satellite radio program subscriptions in a mobile vehicle. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

I claim:

1. A method for modifying a satellite radio subscription corresponding to a user of a telematics-equipped mobile vehicle, the method comprising:

receiving at least one satellite radio subscription modification request at a telematics service provider, wherein the at least one satellite radio subscription modification request comprises a request to add program content to or remove program content from program content subscribed to by the user according to the user's satellite radio subscription;

retrieving current satellite radio program subscription status corresponding to the user at the telematics service provider;

determining at least one adjustment to the user's satellite radio subscription required to implement the at least one modification, wherein determining the at least one adjustment comprises:

comparing the current satellite radio program subscription status to the at least one satellite radio subscription modification request;

identifying a program to be added to the user's satellite radio subscription; and retrieving the program to be added from a database; and updating, by the telematics service provider, the user's satellite radio subscription according to the at least one determined adjustment, wherein updating the user's satellite radio subscription comprises adding the retrieved program to the user's satellite radio subscription.

2. The method of claim 1 wherein receiving the at least one modification request compriese utilizing a user interface.

3. The method of claim 1 wherein retrieving current satellite radio program subscription status comprises:

locating subscription status data corresponding to the user stored within a medium associated with the telematics service provider;

requesting the located subscription status data; and receiving the located subscription status data.

4. The method of claim 1 wherein retrieving current satellite radio program subscription status comprises:

locating subscription status data corresponding to the user stored within a medium associated with the mobile vehicle;

requesting the located subscription status data; and receiving the located subscription status data.

5. The method of claim 1 wherein determining the at least one adjustment comprises;

comparing the current satellite radio program subscription status to the at least one satellite radio subscription modification request;

identifying at least one program to be removed from the user's satellite radio subscription; and retrieving the program to be removed from a database;

wherein the updating the user's satellite radio subscription comprises removing the retrieved program from the user's satellite radio subscription.

6. The method of claim 1 further comprising:

authorizing the at least one satellite radio subscription modification request.

7. The method of claim 6 wherein authorizing the at least one satellite radio subscription modification request comprises searching a database at the telematics service provider for an identifier of an audio device of the mobile vehicle;

sending authorization request to the mobile vehicle; and receiving an authorization status from the mobile vehicle.

8. A non-transitory computer readable medium having computer-executable instructions for modifying a satellite radio subscription corresponding to a user of a telematics-equipped mobile vehicle stored thereon, the computer-executable instructions, when executed by a processor, causing the following steps to be performed, the steps comprising:

receiving at least one satellite radio subscription modification request at a telematics service provider, wherein the at least one satellite radio subscription modification request comprises a request to add program content to or remove program content from program content subscribed to by the user according to the user's satellite radio subscription;

retrieving current satellite radio program subscription status corresponding to the user at the telematics service provider;

determining at least one adjustment to the user's satellite radio subscription required to implement the at least one modification, wherein determining the at least one adjustment comprises:

comparing the current satellite radio program subscription status to the at least one satellite radio subscription modification request;

identifying a program to be added to the user's satellite radio subscription; and retrieving the program to be added from a database; and updating, by the telematics service provider, the user's satellite radio subscription according to the at least one determined adjustment, wherein updating the user's satellite radio subscription comprises adding the retrieved program to the user's satellite radio subscription.

9. The computer readable medium of claim 8 wherein receiving the at least one modification request comprises utilizing a user interface.

10. The computer readable medium of claim 8 wherein retrieving current satellite radio program subscription status comprises:

locating subscription status data corresponding to the user stored within a medium associated with the telematics service provider;

requesting the located subscription status data; and receiving the located subscription status data.

11. The computer readable medium of claim 8 wherein retrieving current satellite radio program subscription status comprises:

locating subscription status data corresponding to the user stored within a medium associated with the mobile vehicle;

requesting the located subscription status data; and receiving the located subscription status data.

12. The computer readable medium of claim 8 wherein determining the at least one adjustment comprises:

comparing the current satellite radio program subscription status to the at least one satellite radio subscription modification request;

identifying at least one program to be removed from the user's satellite radio subscription; and retrieving the program to be removed from a database;

wherein the updating the user's satellite radio subscription comprises removing the retrieved program from the user's satellite radio subscription.

* * * * *